United States Patent
Park et al.

(10) Patent No.: US 9,135,848 B2
(45) Date of Patent: Sep. 15, 2015

(54) DISPLAY DEVICE

(75) Inventors: Dong-Won Park, Hwaseong-si (KR); Jae Sung Bae, Suwon-si (KR); Bong Hyun You, Yongin-si (KR); Sang-Je Lee, Cheonan-si (KR)

(73) Assignee: Samsung Display Co., Ltd., Yongin (KR)

( * ) Notice: Subject to any disclaimer, the term of this patent is extended or adjusted under 35 U.S.C. 154(b) by 178 days.

(21) Appl. No.: 13/560,459

(22) Filed: Jul. 27, 2012

(65) Prior Publication Data
US 2013/0088503 A1   Apr. 11, 2013

(30) Foreign Application Priority Data
Oct. 7, 2011   (KR) ........................ 10-2011-0102549

(51) Int. Cl.
| G09G 3/20 | (2006.01) |
| G09G 3/36 | (2006.01) |
| H04N 7/01 | (2006.01) |
| H04N 19/132 | (2014.01) |

(52) U.S. Cl.
CPC .. *G09G 3/20* (2013.01); *G09G 3/36* (2013.01); *H04N 7/0122* (2013.01); *H04N 7/0127* (2013.01); *H04N 7/0135* (2013.01); *H04N 19/132* (2014.11); *G09G 2320/0261* (2013.01); *G09G 2320/106* (2013.01); *G09G 2340/0435* (2013.01)

(58) Field of Classification Search
None
See application file for complete search history.

(56) References Cited

U.S. PATENT DOCUMENTS

| 5,812,704 | A | 9/1998 | Pearson et al. |
| 7,034,791 | B1 | 4/2006 | Odom |
| 7,940,241 | B2 | 5/2011 | Bae et al. |
| 8,374,240 | B1 * | 2/2013 | Namboodiri et al. ..... 375/240.12 |
| 2007/0165953 | A1 | 7/2007 | Kim et al. |
| 2007/0285349 | A1 | 12/2007 | Hong et al. |
| 2007/0297513 | A1 * | 12/2007 | Biswas et al. ............ 375/240.16 |
| 2009/0122188 | A1 | 5/2009 | Hanaoka et al. |
| 2009/0322661 | A1 * | 12/2009 | Bae et al. ........................ 345/87 |
| 2011/0175865 | A1 | 7/2011 | Bae et al. |

FOREIGN PATENT DOCUMENTS

| JP | 11-500546 | 1/1999 |
| JP | 3525926 | 2/2004 |
| JP | 4615508 | 10/2010 |
| KR | 10-0545016 | 1/2006 |
| KR | 10-2007-0007726 | 1/2007 |
| KR | 10-2010-0059362 | 6/2010 |

* cited by examiner

*Primary Examiner* — Carlos Perromat
*Assistant Examiner* — Xin Sheng
(74) *Attorney, Agent, or Firm* — H.C. Park & Associates, PLC

(57) ABSTRACT

A display device includes a data request unit in a frame rate controller, and requires and transmits necessary data for the frame data buffer receiving and storing the image data of an entire pixel area and the rest of the frame rate controllers. In a case of a motion picture that is moved among a plurality of display areas, the image data corresponding to a plurality of regions is transmitted from the frame data buffer or a plurality of frame rate controllers, and in a case of the motion picture that is moved between neighboring pixel areas, the image data of the neighboring pixel area is transmitted from the frame data buffer or the neighboring frame rate controller for processing. Accordingly, a fast-moving motion picture may be realized without the need for an additional memory.

7 Claims, 7 Drawing Sheets

DISPLAY DEVICE

CROSS-REFERENCE TO RELATED APPLICATION

This application claims priority from and the benefit of Korean Patent Application No. 10-2011-0102549, filed on Oct. 7, 2011, which is hereby incorporated by reference for all purposes as if fully set forth herein.

BACKGROUND

1. Field

Exemplary embodiments of the present invention relate to a display device having high resolution.

2. Discussion of the Background

The resolution of a display device tends to be gradually increased by technological development. For example, a display device with high resolution of a full high definition (FHD) having a resolution of 1920×1080 has been developed. In the case of a high resolution display device, motion blurring, in which an object appears blurred when realizing a motion picture, may be generated.

To prevent motion blurring, a motion interpolation technique of generating a new image frame in which the motion is interpolated, and a frame rate control technique of controlling the number of frames per second by inserting the generated new image frame between two input image frames that are sequentially input from the outside are used.

However, in the case of these techniques, application of motion interpolation has required an additional memory for storing motion data of an entire pixel area to a frame rate controller to receive the motion data of the entire pixel area. When receiving the motion data of a neighboring region, the motion picture that includes very fast speed motion may not be completed.

The above information disclosed in this Background section is only for enhancement of understanding of the background of the invention and therefore it may contain information that does not form the prior art that is already known in this country to a person of ordinary skill in the art.

SUMMARY OF THE INVENTION

Exemplary embodiments of the present invention provide a high resolution display device capable of realizing a fast-moving motion picture without the need for an additional memory provided in the high resolution display device.

Additional features of the invention will be set forth in the description which follows, and in part will be apparent from the description, or may be learned by practice of the invention.

An exemplary embodiment of the present invention discloses a frame data buffer outputting a plurality of image data groups corresponding to a plurality of display areas and input from the outside; a plurality of frame rate controllers connected to the frame data buffer; and a plurality of display areas connected to a plurality of frame rate controllers, wherein the plurality of frame rate controllers and the frame data buffer are all connected through a data communication line for bi-directional communication.

The plurality of frame rate controllers may respectively include a data request unit.

The data request unit may require image data of a desired position to be transmitted to a portion of the frame data buffer or the plurality of frame rate controllers through the data communication line.

The frame rate controllers may receive the image data of the desired position from the portion of the frame data buffer or the plurality of frame rate controllers through the data communication line.

The display device may further include a first data communication line connecting the frame data buffer and the plurality of frame rate controllers and being capable of uni-directional communication, and the frame rate controllers may receive the image data group from the frame data buffer through the first data communication line.

The frame rate controllers may respectively include a memory, and the memory may store the image data corresponding to one display area connected to a frame rate controller.

A display device according to an exemplary embodiment of the present invention includes the data request unit in the frame rate controller, and requires and transmits necessary data for the frame data buffer receiving and storing the image data of the entire pixel and the rest of the frame rate controllers. In a case of a motion picture that is moved between a plurality of display areas, the image data corresponding to a plurality of regions is transmitted from the frame data buffer or a plurality of frame rate controllers, and in a case of the motion picture that is moved between neighboring pixels, the image data of the neighboring pixel area is transmitted from the frame data buffer or the neighboring frame rate controller for processing. Accordingly, the fast motion picture may be realized without an additional memory.

BRIEF DESCRIPTION OF THE DRAWINGS

The accompanying drawings, which are included to provide a further understanding of the invention and are incorporated in and constitutes a part of this specification, illustrate embodiments of the invention, and together with the description serve to explain the principles of the invention.

DETAILED DESCRIPTION OF THE ILLUSTRATED EMBODIMENTS

Figure 1:
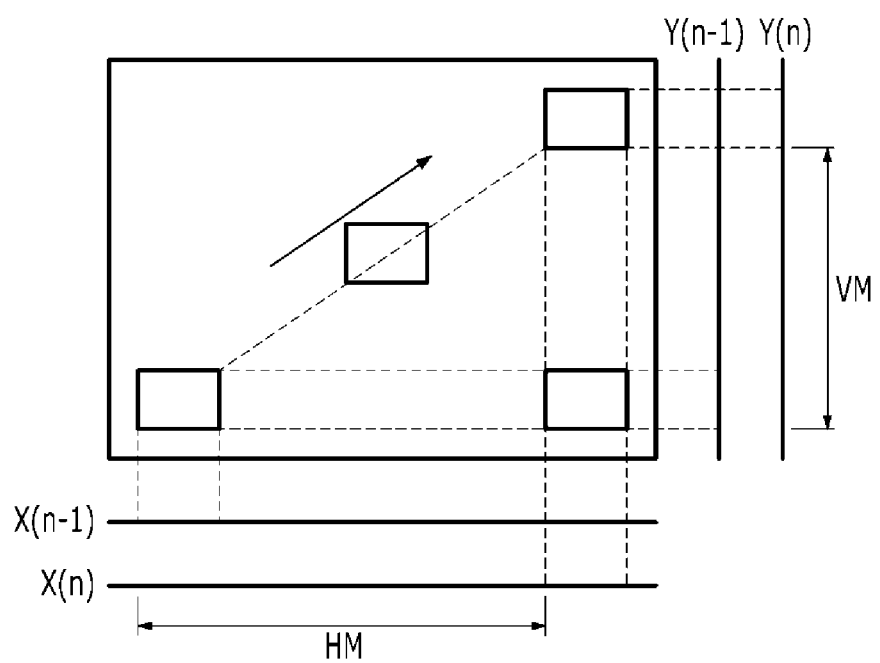
FIG. 1 is an exemplary diagram illustrating a motion interpolation technique applied to a liquid crystal display according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

In the drawings, the thickness of layers, films, panels, regions, etc., are exaggerated for clarity. Like reference numerals in the drawings denote like. It will be understood that when an element such as a layer, film, region, or substrate is referred to as being "on" or "connected to" another element, it can be directly on or directly connected to the other element, or intervening elements may also be present. In contrast, when an element is referred to as being "directly on" or "directly connected to" another element, there are no intervening elements present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

First, referring to FIG. 1, a motion interpolation technique applied to a liquid crystal display according to an exemplary embodiment of the present invention will be described. FIG. 1 is an exemplary diagram illustrating a motion interpolation technique applied to a liquid crystal display according to an exemplary embodiment of the present invention.

Referring to FIG. 1, an object is moved from a left lower side of a display screen to a right upper side of the display screen. X(n−1) represented in the drawing is an X-axis coordinate value of a previous frame, and X(n) is the coordinate value of a current frame. Also, Y(n−1) represented in the drawing is a Y-axis coordinate value of the previous frame, and Y(n) is the Y-axis coordinate value of the current frame. A horizontal motion vector HM is calculated from a difference between the X-axis coordinate value of the current frame and the X-axis coordinate value of the previous frame. A vertical motion vector VM is calculated from a difference between the Y-axis coordinate value of the current frame and the Y-axis coordinate value of the previous frame. The horizontal motion vector HM may include direction information and speed information for an X-axis direction in which the image is moved, and the vertical motion vector VM may include the direction information and the speed information for a Y-axis direction in which the image is moved.

If the horizontal motion vector HM and the vertical motion vector VM are calculated, motion estimation for the object is performed by using the calculated horizontal and vertical motion vectors HM and VM. A movement path of the image displayed on the display screen is estimated via the motion estimation. A new middle image is generated which represents the object positioned upon the estimated movement path.

Figure 2:
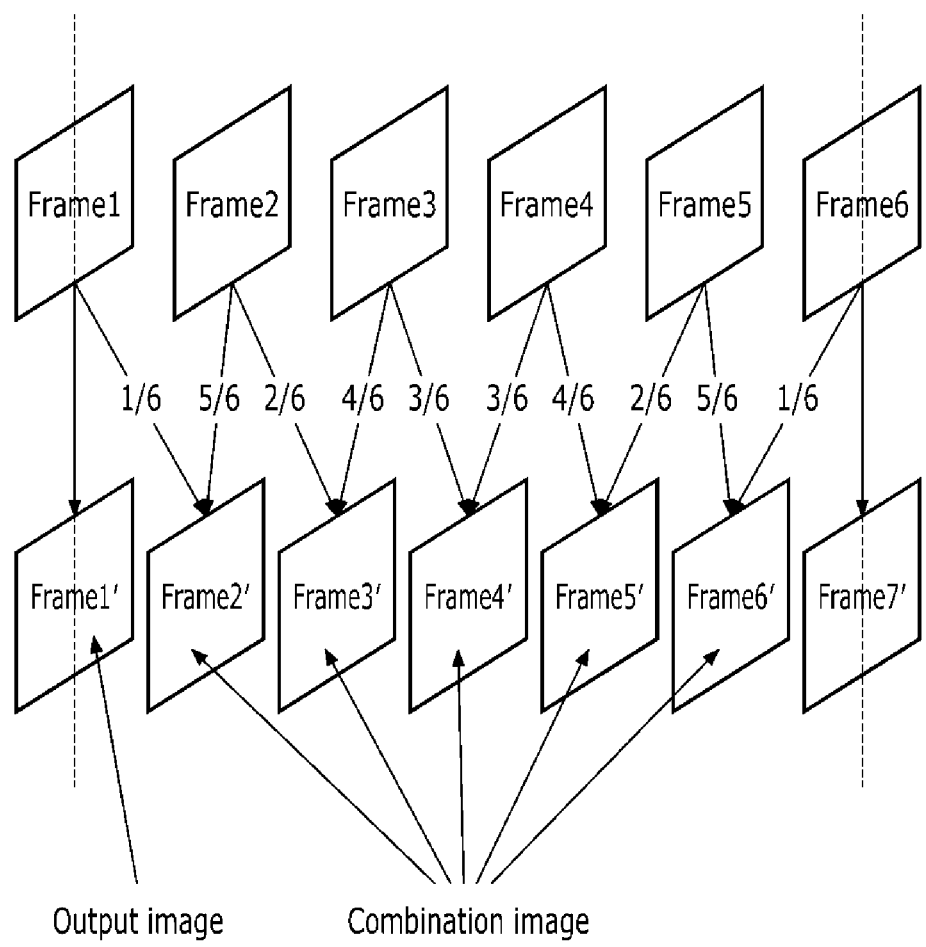
FIG. 2 is a view of a frame rate control technique according to an exemplary embodiment of the present invention.

FIG. 2 is a view of a frame rate control technique according to an exemplary embodiment of the present invention.

Referring to FIG. 2, a frame rate control technique is a technique of changing a frame rate of an input image frame transmitted per second. The frame rate means the number of frames allocated per second.

In FIG. 2, the first to sixth input image frames Frame1, Frame2, Frame3, Frame4, Frame5, and Frame6 are frames of the input image input to a frame rate conversion device described above, and the first to seventh output image frames Frame1', Frame2', Frame3', Frame4', Frame5', Frame6', and Frame2' are frames of an output image output to the frame rate conversion device.

As shown in FIG. 2, when changing the first to fifth input image frames Frame2-Frame5 of 5 frames into the first to sixth output image frames Frame1'-Frame6' of 6 frames through a frame rate conversion operation, the first output image frame Frame1' that is the same as the first input image frame Frame1 and the second to the sixth output image frames Frame2'-Frame6' that are motion-interpolated are generated from the first to fifth input image frames Frame1-Frame5.

For example, the second output image frame Frame2' is the frame generated based on the motion vector calculated from the first input image frame Frame1 and the second input image frame Frame2. If it is assumed that the first input image frame Frame1 has a position of 0 and the second input image frame Frame2 has a position of 1, the second output image frame Frame2' is generated by combining an image predicted at a distance of $1/6$ in a direction to the second input image frame Frame2 from the first input image frame Frame1 and an image predicted at a distance of $5/6$ in the direction to the first input image frame Frame1 from the second input image frame Frame2.

The third output image frame Frame3' is generated by combining the image predicted at the distance of $2/6$ to the third input image frame Frame3 from the second input image frame Frame2 and the image predicted at the distance of $4/6$ to the second input image frame Frame2 from the third input image frame Frame3. Through the same method, the fourth to sixth output image frames Frame4', Frame5', and Frame6' are respectively generated.

Next, a display device having very high resolution according to an exemplary embodiment of the present invention applied with the above-described motion interpolation method and frame rate control method will be described with reference to the accompanying drawings.

Figure 3:
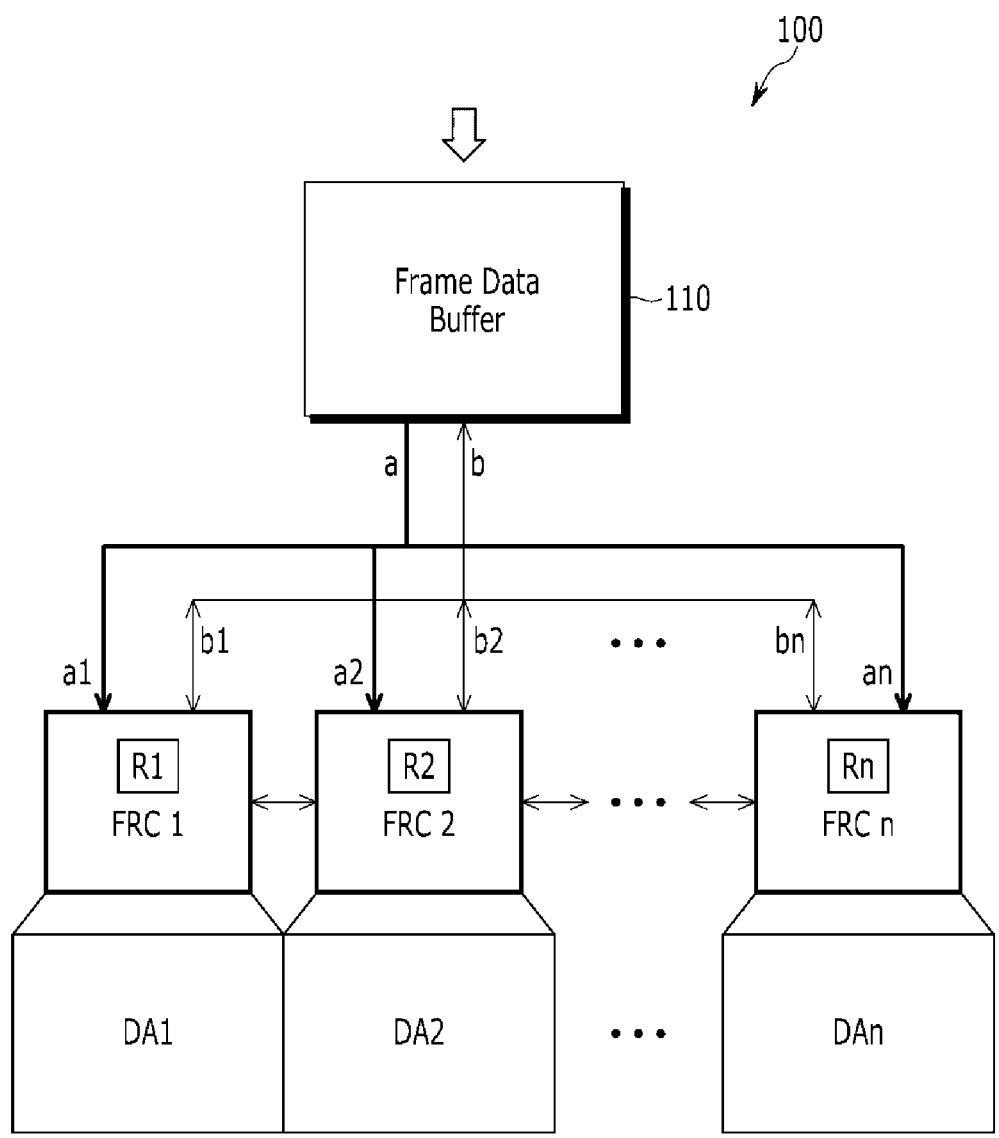
FIG. 3 is a block diagram of a display device according to an exemplary embodiment of the present invention.

A display device according to an exemplary embodiment of the present invention will be described with reference to FIG. 3. FIG. 3 is a block diagram of a display device according to an exemplary embodiment of the present invention.

Referring to FIG. 3, a display device 100 according to an exemplary embodiment of the present invention includes a frame data buffer 110, n frame rate controllers FRC1, FRC2, . . . , FRCn, and n display units DA1, DA2, . . . , Dan.

In the present exemplary embodiment, it is assumed that the display units DA1, DA2, . . . , Dan include a liquid crystal panel having a resolution of (n×i)×j. For example, n may be a natural number of more than 2, i may be 1024, and j may be 2160, and if n=4, the number of frame rate controllers and display units is 4, and in this case, the display device may have a resolution of 4096×2160.

The frame data buffer 110 receives the image data from a video system disposed outside and transmits it to the frame rate controllers FRC1, FRC2, . . . , FRCn.

The frame data buffer 110 receives the image data corresponding to the resolution of the display device. For example, the frame data buffer 110 receives the image data of 4096×2160, and divides the image data into n and transmits the image data to the frame rate controllers FRC1, FRC2, . . . , FRCn. The frame data buffer 110 may be a graphics chip or an image data divider.

The frame data buffer 110 and the frame rate controllers FRC1, FRC2, . . . , FRCn are connected by the first data communication line a for uni-directional communication. The first data communication line a includes a plurality of the first communication units a1, a2, . . . , an connected to the frame rate controllers FRC1, FRC2, . . . , FRCn.

The frame rate controllers FRC1, FRC2, . . . , FRCn respectively include data request units R1, R2, . . . , Rn. The data request units R1, R2, . . . , Rn require the image data of a desired pixel area to be transmitted to the frame data buffer 110 or the frame rate controllers FRC1, FRC2, . . . , FRCn, if necessary.

The frame rate controllers FRC1, FRC2, . . . , FRCn are respectively connected to the frame data buffer 110 and the rest of the frame rate controllers FRC1, FRC2, . . . , FRCn through the second data communication line b for bi-directional communication. The second data communication line b includes a plurality of the second communication units b1, b2, . . . , bn respectively connected to the frame rate controllers FRC1, FRC2, . . . , FRCn. Accordingly, the data request units R1, R2, . . . , Rn may require the image data or the motion vector value of the desired pixel area to be transmitted to the frame data buffer 110 or the frame rate controllers FRC1, FRC2, ..., FRCn through the second communication units b1, b2, ..., bn, and may receive the data. The second data communication line b may be a serial protocol such as an I2C (inter-integrated circuit, "I square C"), an SPI (serial peripheral interface), or an AS.

Also, the frame data buffer 110 may calculate the motion vector of the image data of each of the display units DA1, DA2, ..., Dan, and in this case, the data request units R1, R2, ..., Rn may require and transfer the calculated motion vector to the frame data buffer 110.

Figure 4:
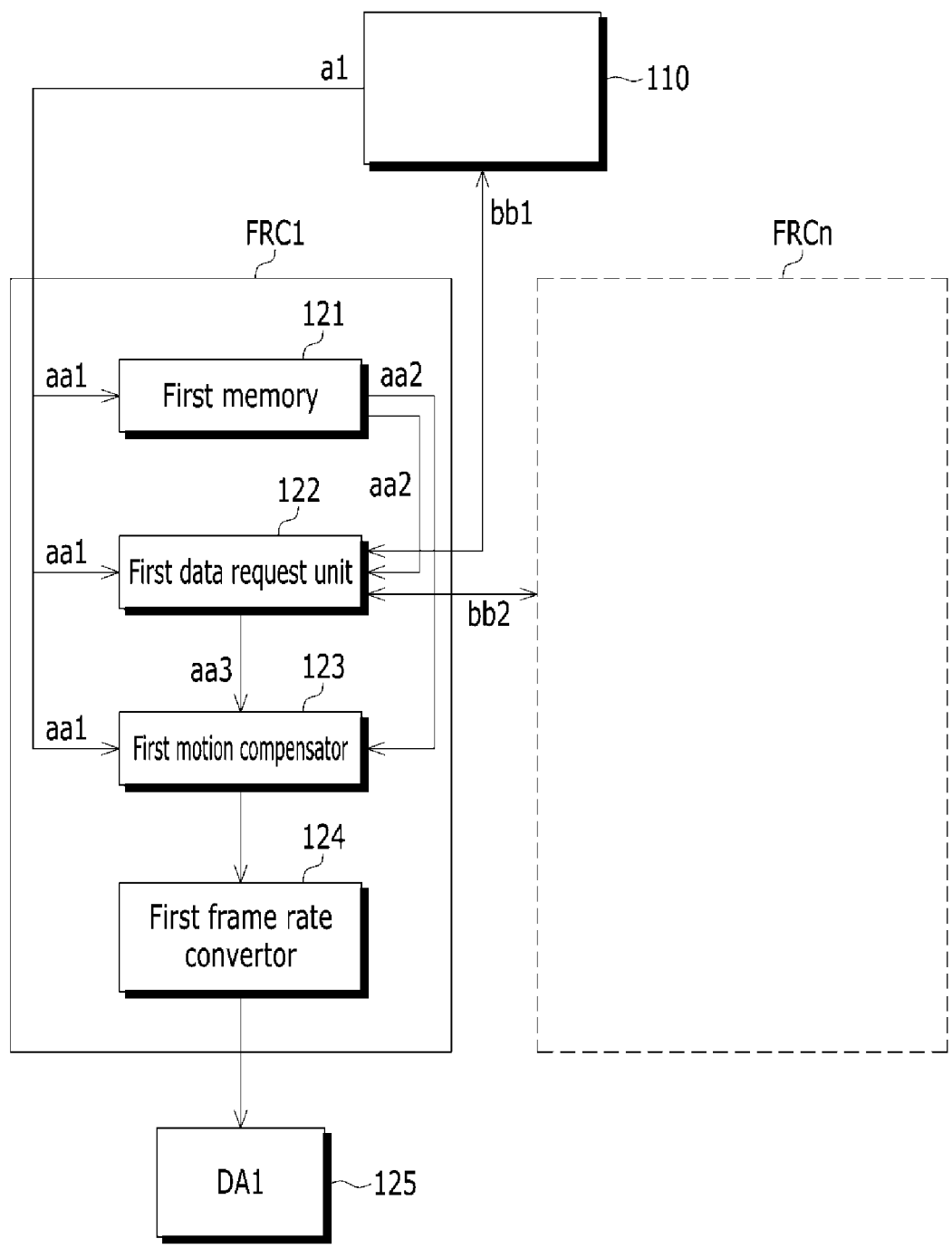
FIG. 4 is a block diagram of the frame rate controller shown in FIG. 3.

Next, a frame rate controller of a display device according to an exemplary embodiment of the present invention will be described with reference to FIG. 4. FIG. 4 is a block diagram of the frame rate controller shown in FIG. 3. FIG. 4 focuses on the first frame rate controller FRC1.

Referring to FIG. 4, the first frame rate controller FRC1 includes a first memory 121, a first data request unit 122, a first motion compensator 123, and a first frame rate convertor 124. The other frame rate controllers FRC2, ..., FRCn may have the same configuration.

The first frame rate controller FRC1 receives the image data or the motion vector value from the frame data buffer 110 through the first communication unit a1. The input image data may be transmitted to the first memory 121, the first data request unit 122, and the first motion compensator 123 through the first transmitting line aa1. However, after the input image data are transmitted and stored to the first memory 121, the first data request unit 122 or the first motion compensator 123 may receive the stored data from the first memory 121 through the second transmitting line aa2. After the first data request unit 122 analysis of the input image data, when additional image data or another motion vector value does not exist, the first data request unit 122 requires the image data or the motion vector for the frame data buffer 110 to be transmitted through the first portion bb1 of the first communication unit b1 of the second data communication line b, or the image data or the motion vector to be transmitted to the other frame rate controller FRCn through the second portion bb2 of the first communication unit b1 of the second data communication line b.

When the first data request unit 122 requires the image data or the motion vector for the frame data buffer 110, the frame data buffer 110 may transmit the required data through the first communication unit a1 or the first communication unit b1 of the second data communication line b for bi-directional communication.

After the first data request unit 122 receives the required data, the first data request unit 122 transmits the required data to the first motion compensator 123 through the third transmitting line aa3, the first motion compensator 123 estimates the motion by using the motion vector of the motion picture, and the first frame rate convertor 124 calculates and transmits the prediction image data to the first display unit 125.

In this way, the frame rate controllers FRC1, FRC2, ..., FRCn of the display device according to an exemplary embodiment of the present invention respectively include the data request units R1, R2, ..., Rn, and are connected to the frame data buffer 110 through the first data communication line a for the uni-directional communication. Also, the frame rate controllers FRC1, FRC2, ..., FRCn are respectively connected to the frame data buffer 110 and the rest of the frame rate controllers FRC1, FRC2, ..., FRCn through the second data communication line b for the bi-directional communication.

Accordingly, if necessary, the frame rate controllers FRC1, FRC2, ..., FRCn may respectively receive and process the image data of the entire pixel area from the frame data buffer in the case of the motion picture that is moved within the entire screen, or may respectively receive and process the image data of the neighboring pixel area from the neighboring frame rate controller in the case of the motion picture that is moved between neighboring pixel areas. Therefore, without an additional memory, a fast-moving motion picture may be correctly realized.

However, in the case of the display device according to another exemplary embodiment of the present invention, the first communication line a may be omitted. In detail, the frame rate controllers FRC1, FRC2, ..., FRCn respectively include the data request units R1, R2, ..., Rn and may be connected to the frame data buffer 110 through only the second data communication line b for the bi-directional communication of the fast speed. Accordingly, the frame rate controllers FRC1, FRC2, ..., FRCn may receive all the data through the second data communication line b for the bi-directional communication from the frame data buffer 110.

Figure 5A:
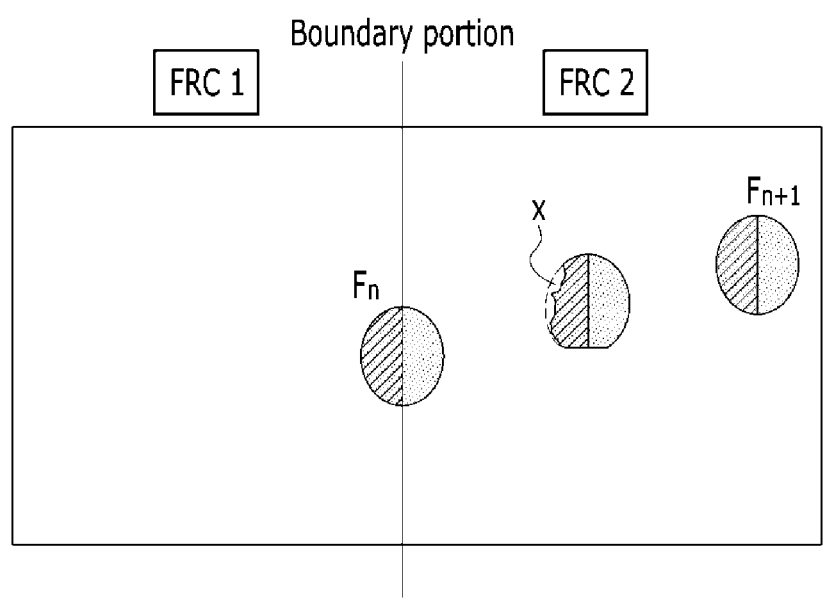
FIG. 5A and FIG. 5B are diagrams illustrating the first operation of a display device according to an exemplary embodiment of the present invention.
Figure 5B:
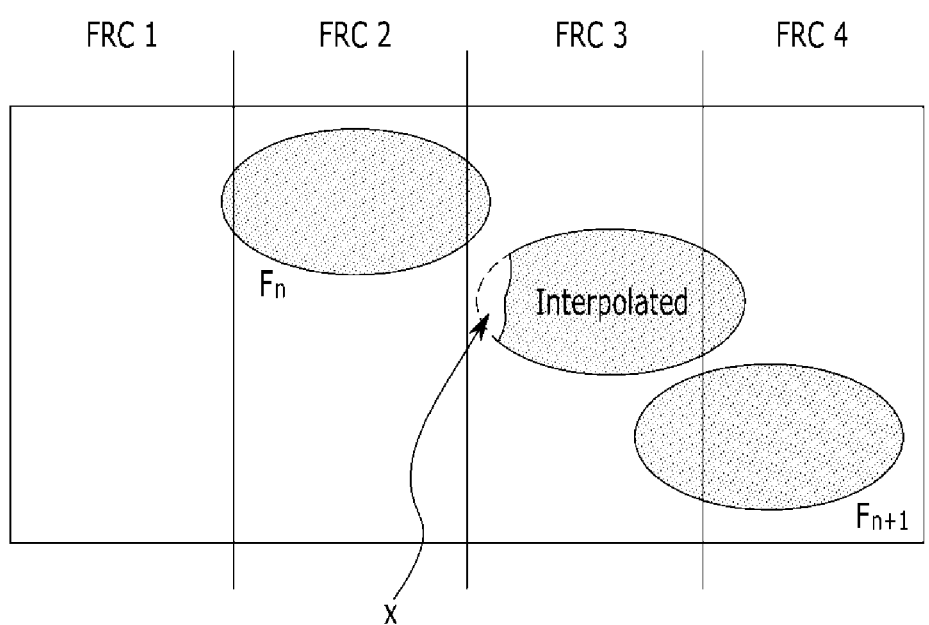
Figure 6:
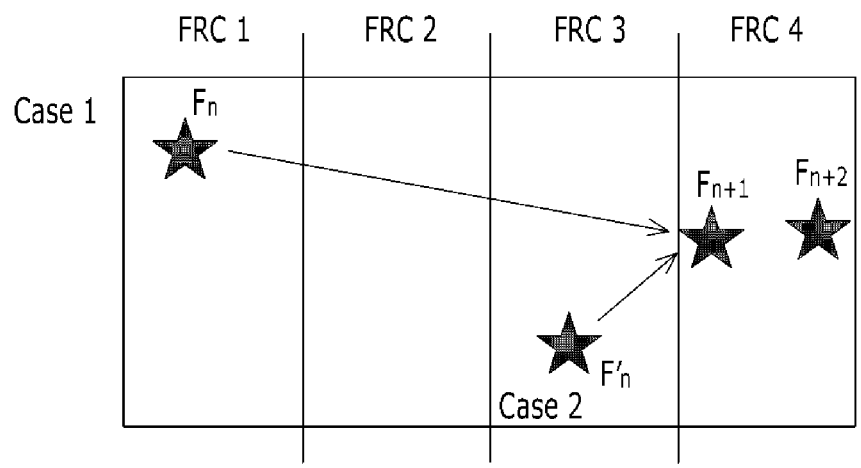
FIG. 6 is a diagram illustrating the second operation of a display device according to an exemplary embodiment of the present invention.

Thus, an operation of each frame rate controller FRC1, FRC2, ..., FRCn of the display device according to an exemplary embodiment of the present invention will be described with reference to FIG. 5A, FIG. 5B, and FIG. 6. FIG. 5A and FIG. 5B are diagrams illustrating the first operation of a display device according to an exemplary embodiment of the present invention, and FIG. 6 is a diagram illustrating the second operation of a display device according to an exemplary embodiment of the present invention.

The first operation of a display device according to an exemplary embodiment of the present invention will be described with reference to FIG. 5A and FIG. 5B.

First, referring to FIG. 5A along with FIG. 3, in a case of an image that is disposed in both the first display unit region and the second display unit region in the first frame Fn and then is moved to only the second display unit region in the second frame F(n+1), the second data request unit R2 of the second frame rate controller FRC2 requires the image data information of the boundary portion between the first display unit region and the second display unit region to be transmitted from the first frame rate controller FRC1. Accordingly, all of the correct prediction image data may be obtained without a loss portion (x).

Next, referring to FIG. 5B along with FIG. 3, the shown image is disposed throughout a wide region extending from the first display unit region into the third display unit region in the first frame Fn, and then is moved into the region extending from the third display unit region into the fourth display unit region in the second frame F(n+1). Accordingly, when the third frame rate controller FRC3 calculates only the prediction image data of the second display unit region, the image data of the portion x is lost and the correct prediction is impossible. Accordingly, to obtain the complete prediction image data, the third data request unit R3 of the third frame rate controller FRC3 requires an additional image data of the loss portion of the first display unit region to be transmitted to the first frame rate controller FRC1 or the frame data buffer 110. The third frame rate controller FRC3 may calculate all of the complete prediction image data by using the additional required image data y as well as the image data of the second display unit region. Accordingly, although the image is moved which is initially disposed in a wide region including a display unit region and neighboring display unit regions, the correct motion data may be calculated.

Referring to FIG. 6, the second operation of the display device according to an exemplary embodiment of the present invention will be described.

Referring to FIG. 6 along with FIG. 3, in the first case (case 1), a star is disposed in the first display unit region in the first frame Fn, and then is moved into the fourth display unit region in the second frame F(n+1). In this case, the fourth frame rate controller FRC4 receives the image information from the first frame rate controller FRC1 that is separated from the fourth frame rate controller FRC4 or the frame data buffer 110, and thereby the prediction image data reflecting the correct motion vector of the star may be obtained. In the second case (case2), the star is disposed in the third display unit region in the first frame Fn and is then moved into the fourth display unit region in the second frame F(n+1). In this case, the fourth frame rate controller FRC4 receives the image information from the third frame rate controller FRC3 that is close thereto or the frame data buffer 110, and thereby the prediction image data reflecting the correct motion vector of the star may be obtained.

As described above, the display device according to an exemplary embodiment of the present invention may require and receive the image data of the desired pixel area from a frame rate controller that is separated from the desired pixel area or the frame data buffer 110 in which the entire image data is input and stored, as well as the neighboring frame rate controller, to calculate the motion vector under the frame rate control according to the position of the necessary image data, thereby calculating the prediction image data. Accordingly, in the image that is quickly moved throughout a wide region including a display unit region and neighboring display units, correct motion data may be obtained.

As described above, in the display device according to an exemplary embodiment of the present invention, a plurality of frame rate controllers include the data request unit, and bi-directional communication is possible between a plurality of frame rate controllers and between the frame rate controller and the frame data buffer. The frame rate controller may easily receive the image data of the desired position without an additional memory, and the prediction image data of the motion picture that is disposed throughout a wide region or is quickly moved may be correctly calculated and obtained.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:
1. A display device comprising:
a frame data buffer outputting a plurality of image data groups corresponding to a plurality of display areas;
a plurality of frame rate controllers connected to the frame data buffer, each of the frame rate controllers comprising:
a data request unit; and
a motion compensator configured to receive an output of the data request unit,
the motion compensator and the data request unit being disposed in the same frame rate controller; and
a plurality of display areas connected to the plurality of frame rate controllers,
wherein:
the plurality of frame rate controllers and the frame data buffer are all connected together through a first data communication line configured for bi-directional communication;
the frame data buffer is connected to the data request unit in each of the frame rate controllers through the first data communication line;
the display device further comprises a second data communication line connecting the frame data buffer and the plurality of frame rate controllers and configured to perform uni-directional communication; and
the frame rate controllers receive the image data group from the frame data buffer through the second data communication line.

2. The display device of claim 1, wherein the data request unit requires image data of a desired position to be transmitted to a portion of the frame data buffer or the plurality of frame rate controllers through the first data communication line.

3. The display device of claim 2, wherein the frame rate controllers receive the image data of the desired position from the portion of the frame data buffer or the plurality of frame rate controllers through the first data communication line.

4. The display device of claim 3, wherein:
each of the frame rate controllers further comprises a memory; and
the memory stores the image data corresponding to one display area connected to a frame rate controller.

5. The display device of claim 1, wherein each of the frame rate controllers comprises a memory configured to store the image data corresponding to one display area connected to a frame rate controller.

6. The display device of claim 1, wherein the motion compensator is configured to estimate motion by using a motion vector of a motion picture displayed by a display unit of the display device.

7. The display device of claim 6, wherein each of the frame rate controllers further comprises a frame rate convertor configured to receive an output of the motion compensator and to calculate and transmit prediction image data to the display unit.

* * * * *